United States Patent
Schenk

(10) Patent No.: US 9,352,398 B2
(45) Date of Patent: May 31, 2016

(54) HIGH-FREQUENCY SPINDLE

(71) Applicant: Peter Schenk, Niederstotzingen (DE)

(72) Inventor: Peter Schenk, Niederstotzingen (DE)

(73) Assignee: ROEHM GMBH, Sontheim (DE)

( * ) Notice: Subject to any disclaimer, the term of this patent is extended or adjusted under 35 U.S.C. 154(b) by 413 days.

(21) Appl. No.: 13/689,942

(22) Filed: Nov. 30, 2012

(65) Prior Publication Data

US 2014/0154024 A1    Jun. 5, 2014

(30) Foreign Application Priority Data

Dec. 5, 2011    (DE) .......................... 10 2011 056 021

(51) Int. Cl.
*B23B 31/26*    (2006.01)
*B23C 5/26*    (2006.01)

(52) U.S. Cl.
CPC ................ *B23B 31/263* (2013.01); *B23C 5/26* (2013.01); *Y10T 409/309408* (2015.01); *Y10T 409/309464* (2015.01)

(58) Field of Classification Search
CPC ........... Y10T 409/309408; Y10T 409/309464; B23C 5/26; B23C 5/265; B23B 31/24; B23B 31/26; B23B 31/263
USPC ................................................ 409/232, 233
See application file for complete search history.

(56) References Cited

U.S. PATENT DOCUMENTS

| | | | | |
|---|---|---|---|---|
| 4,680,999 A | * | 7/1987 | Kojima et al. .................. | 82/160 |
| 5,415,066 A | * | 5/1995 | Erickson et al. ................ | 82/160 |
| 5,870,935 A | * | 2/1999 | Erickson et al. ................ | 82/160 |
| 5,927,168 A | * | 7/1999 | Needham ........................ | 82/160 |
| 7,287,941 B1 | * | 10/2007 | Erickson ........................ | 409/233 |
| 2006/0239788 A1 | * | 10/2006 | Hyun ............................ | 409/233 |
| 2010/0196113 A1 | * | 8/2010 | Erickson et al. .......... | 408/239 R |
| 2011/0174121 A1 | * | 7/2011 | Erickson et al. ................ | 82/160 |

FOREIGN PATENT DOCUMENTS

| | | | |
|---|---|---|---|
| DE | 4326262 | A1 | 2/1995 |
| DE | 4327148 | C2 | 5/1996 |
| DE | 19650481 | C2 | 6/1998 |
| DE | 19920264 | A | 11/2000 |
| DE | 10319796 | A1 | 11/2004 |
| DE | 602005000755 | T2 | 12/2007 |
| EP | 1559516 | A2 | 8/2005 |
| GB | 2154479 | A * | 9/1985 |
| JP | 2001277062 | A * | 10/2001 |

* cited by examiner

*Primary Examiner* — Erica E Cadugan
*Assistant Examiner* — Michael Vitale
(74) *Attorney, Agent, or Firm* — Andrew Wilford

(57) ABSTRACT

A high-frequency spindle has a tube shaft extending along and rotatable about an axis, a chuck carried on a front end of the shaft, adapted to fit with a tool or tool holder, and a ball cage in the shaft and having a radially extending window. A locking ball os radially displaceable in the window between a holding position engaging in a seat of the tool and a freeing position clear of the seat. An angled surface is engageable radially with the ball, and an actuating rod is axially shiftable and coupled to the cage or to the angled surface. An actuator can axially shift the rod and thereby relatively axially displace the ball and the angled surface and cam the ball with the angled surface into the holding position. A primary spring biases the rod so as shift the ball with the angled surface into the holding position.

16 Claims, 2 Drawing Sheets

HIGH-FREQUENCY SPINDLE

FIELD OF THE INVENTION

The present invention relates to a spindle of a machining apparatus. More particularly this invention concerns a high-speed or -frequency spindle.

BACKGROUND OF THE INVENTION

A standard high-frequency spindle has a shaft, a release unit, and a chuck that can be moved between a holding position and a freeing position. The chuck further has at least one retaining element that can be moved radially relative to the longitudinal axis of the spindle by changing the axial position of a spring-loaded actuating rod and that is provided to axially secure the position of a tool or a tool holder associated with the high-frequency spindle by positive engagement and radial frictional engagement.

High-frequency spindles are characterized by their high rotation speeds of greater than or equal to 50,000 rpm. There are already various known methods for changing or gripping tools or tool holders. A differentiation is made between a manual and an automatic gripping system. In the manual system, changing the tool and gripping the tool are effected by hand. In automatic gripping systems, gripping the tool is effected by means of a spring and replaceable collet chucks, such as, for example, disclosed in DE 199 20 264.

The use of collet chucks, however, can result in axial displacement of the tool along the longitudinal axis of the spindle during operation, and this produces inconsistencies in machining the workpiece. In addition, high-frequency spindles having an automatic gripping system with collet chucks have the problem that changing a tool involves changing the collet chucks, and the result is a considerable cost in terms of time. Necessitated by design, automatic gripping systems that are based on a shank cone or a hollow shank cone require a relatively large spindle diameter. A further problem is releasing the holding position in an automatic gripping system. Here force is often applied by a stationary release piston against the spindle bearing. Particularly in the case of high-frequency spindles, this axial force has negative effects on the service life of the spindle bearing.

OBJECT OF THE INVENTION

The object of this invention is to reduce the above-referenced disadvantages of a high-frequency spindle of the type mentioned above.

SUMMARY OF THE INVENTION

A high-frequency spindle has a tube shaft extending along and rotatable about an axis, a chuck carried on a front end of the shaft, adapted to fit with a tool or tool holder, and a ball cage in the shaft and having a radially extending window. A locking ball os radially displaceable in the window between a holding position engaging in a seat of the tool and a freeing position clear of the seat. An angled surface is engageable radially with the ball, and an actuating rod is axially shiftable and coupled to the cage or to the angled surface. An actuator can axially shift the rod and thereby relatively axially displace the ball and the angled surface and cam the ball with the angled surface into the holding position. A primary spring biases the rod so as shift the ball with the angled surface into the holding position.

This results in a simple design, and also enables a high-frequency spindle to be achieved that has a very compact construction.

It is advantageous if the locking balls are provided at least as a pair. This yields an improved chucking capability for the tool or tool holder associated with high-frequency spindle and thus improved usability for the user, and also has a positive effect on the concentricity of the high-frequency spindle.

It has been found especially advantageous in terms of the usability of the high-frequency spindle if the outer diameter of the high-frequency spindle can be smaller than 15 millimeters, and preferably smaller than or equal to 10 millimeters. This enables the high-frequency spindle according to the invention to be employed even in areas that require the high-frequency spindle to have very compact dimensions. One area here, by way of example, is dentistry.

It is furthermore advantageous for the high-frequency spindle according to the invention if a biaser housing to hold the ball cage is provided in the shaft, and if the ball cage is axially movable within the biaser housing. The axial movability of the ball cage enables axial longitudinal compensation to be achieved that ensures the tool cone is reliably fitted to the spindle collar. This approach not only provides design advantages, it also ensures the functionality of the high-frequency spindle due to the axial movabililty of the ball cage. It has furthermore been found especially advantageous in terms of user friendliness of the high-frequency spindle if an active gripping of the tool or tool holder is implemented by a spring that is associated with the ball cage, the spring action of which opposes the biasing spring of the actuating rod, and the axial movement of which is restricted relative to the biaser housing by pins provided in the biaser housing or in the shaft, and by slots corresponding thereto in the ball cage. The active gripping of the tool or tool holder achieved thereby contributes significantly to facilitating the handling of the high-frequency spindle. In addition, the biasing spring of the actuating rod is protected from being overloaded and this has a positive effect on the service life of the high-frequency spindle.

The high-frequency spindle according to the invention if the actuating rod includes an actuating surface on the end facing the tool or tool holder, the actuating surface being provided to radially adjust the locking balls. This results in a high level of operational reliability for the chuck.

A tool collar is associated with the tool or tool holder, and a ball seat is provided, in particular a groove that interacts with the locking balls, for the purpose of axially fixing the position of the tool or tool holder on the inner face of the tool collar. This prevents any axial movement by the tool or tool holder in the holding position.

In the high-frequency spindle according to the invention a spindle collar is provided in the shaft, the spindle collar being provided to create a frictional engagement with the outer face of the tool collar of the tool or tool holder. This facilitates the centering of the tool or tool holder when the tool is inserted, and this also has a positive effect on user friendliness.

Also with the high-frequency spindle according to the invention the ball cage and the locking balls are axially fixed relative to the actuating rod and if the tool guide sleeve that is protected by appropriate sealing elements providing protection against contamination is provided in the high-frequency spindle, the sleeve functioning to receive the tool shank. This ensures operational reliability since it prevents contamination from penetrating into the high-frequency spindle, and it furthermore enables an even more compact design to be achieved, which aspects additionally enhance the usability and the service life of the high-frequency spindle.

The tool guide sleeve in accordance with the invention includes a cam formation that is provided to radially adjust the locking balls when the actuating rod is axially adjusted. The interaction between actuating rods and locking balls enables a high level of operational reliability to be achieved for the high-frequency spindle according to the invention in terms of gripping the tool shank.

The release unit is a multi-step single-acting cylinder that rotates together with the chuck and the shaft, and is composed of multiple piston disks, each including a piston housing and an opposite face of the piston. Due to the integration of the release unit in the rotating shaft and the resulting simultaneous rotation of the release unit together with the shaft, no force is exerted on the bearing. The multi-step design of the single-acting cylinder enables an increased amount of force to be transmitted to the actuating rod and this allows significantly reduced forces to be applied to the individual pistons. This enables the demands on the installed sealing elements to be reduced, and optimal use can be made of the available installation space.

For the operational reliability and functionality of the high-frequency spindle according to the invention a gap is provided between the piston housing and the shaft to vent the opposite side of the piston.

The release unit is according to the invention a double-acting cylinder that is integrated with force-amplifying means and with which an actuating wedge is associated to interact with at least one release ball. No load is applied to the spindle bearing since the release unit acts directly on the actuating rod. This results in an increased level of operational reliability for the release unit and ensures a long service life for the high-frequency spindle.

In terms of the user friendliness and operational reliability of the high-frequency spindle according to the invention, provision is furthermore made whereby in the holding position axial movement of the double-acting cylinder toward the actuating rod is provided by supplying compressed air to a release pressure conduit to amplify the force, which movement can be converted through the actuating wedge into radial movement of the release balls and a resulting axial movement of the actuating rod against the return force of the spring of the spring-reinforced actuating rod and which is longer than the axial motion of the actuating rod. The resulting force amplification reduces the demand on the pressure to be supplied and on the sealing elements inside the piston.

The outer diameter of the tool shank is standardized and a ball seat, in particular a groove, is associated with the tool shank around its outer circumference. This enables different tools to be used, which aspect enhances the user friendliness and the versatility of the high-frequency spindle according to the invention.

In terms of further miniaturizing the high-frequency spindle according to the invention for a wide range of applications—for example, in dentistry—it has been found especially advantageous if the outer diameter of the tool shank is smaller than or equal to 3 millimeters.

BRIEF DESCRIPTION OF THE DRAWING

The above and other objects, features, and advantages will become more readily apparent from the following description, reference being made to the accompanying drawing in which.

DETAILED DESCRIPTION

Figure 1:
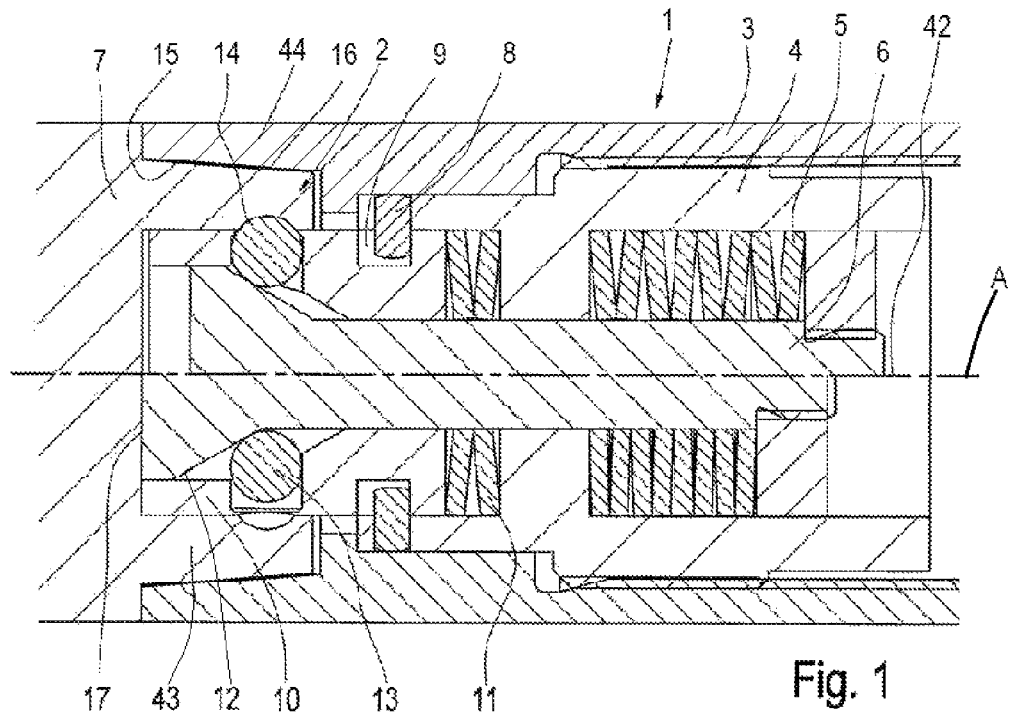
FIG. 1 is an axial section through a first embodiment of the chuck of a high-frequency spindle.

As seen in FIG. 1 a high-frequency spindle 1 has a front end forming a chuck 2 that is held on a tube shaft 3 centered on an axis A. A biaser housing 4 is provided in the shaft 3, here rotationally fixed to the shaft 3. A biasing spring 5, here a stack of Belleville washers, is provided in the biaser housing 4 and is effective axially to urge an actuating rod 6 axially rearward away from the tool or tool holder 7. A pin 8 is provided in the biaser housing 4, engaging radially in a slot 9 in a ball cage 10 and enabling the ball cage 10 to move axially limited relative to the biaser housing 4, since the slot 9 is axially wider than the pin 8.

The view is in two parts with the top half showing the chuck 2 in the holding position and the bottom half showing it in the freeing position. Axial movement rearward in to the freeing position is counteracted by a second spring 11 that functions to actively bias the tool or tool holder 7 axially forward (to the left in FIG. 1) and hold the parts together with prestress.

A frustoconical actuating face 12 of the actuating rod 6 in the locking position presses at least one locking ball 13 radially outward in a respective radially throughgoing window of the cage 10 into a ball seat 14 of the tool or tool holder 7. This positive engagement of the locking ball 13 in the ball seat 14, which is formed as a semicircular groove in the illustrated embodiment, creates radial frictional engagement that locks the tool or tool holder 7 axially in place during high-speed rotation of the spindle 1 about the axis A for machining a stationary workpiece with a tool held in the holder 7.

The tool or tool holder 7 has a tool collar 43 extending axially toward the actuating rod 6. An outer face of the tool collar 43 of the tool or tool holder 7 is frustoconical and complementary to an inner surface 16 of a spindle collar 44 of the shaft 3. The result is that additional frictional engagement is created between a frustoconical outer face 15 of the tool collar 43 and the complementary inner face 16 of the spindle collar 44 of the shaft 3 when the tool or tool holder 7 is fitted in place.

In the freeing position, the actuating rod 6 is offset axially forward away from the biasing spring 5, and the actuating surface 12 no longer pushes the locking ball 13 outward, thereby enabling this ball 13 to retract radially inward into the ball cage 10, with the result that the tool or tool holder 7 can be removed axially forward from the chuck 2. The outer face 15 of the tool collar 43 is separated from the inner face 16 of the spindle collar 44 when the actuating rod 6 strikes axially forward against a flat end face 17 of the tool collar 43.

Figure 2:
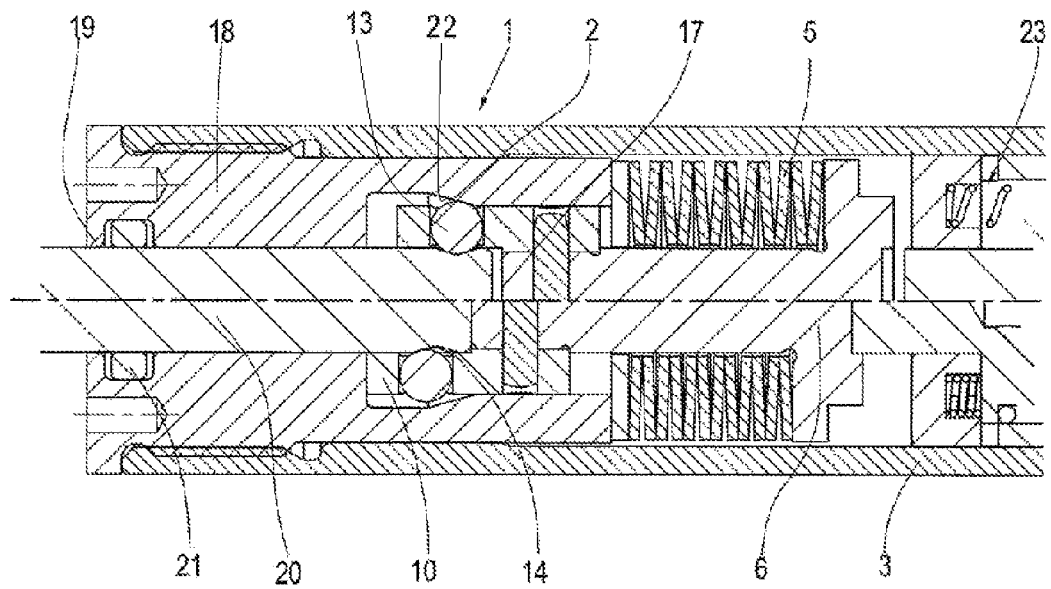
FIG. 2 is an axial section of another embodiment of the chuck of a high-frequency spindle.

FIG. 2 shows the high-frequency spindle 1 according to the invention with a different chuck 2. The shaft here holds a tool guide sleeve 18 that has a bore 19 for snugly receiving a tool shank 20 and that protects the interior of the high-frequency spindle 1 from contamination by a suitable seal 21 that is set in an inwardly open groove in the bore 19 and bears radially inward on the cylindrical outer surface of the tool shank 20. Springs 5 again bias the rod 6 axially rearward.

Again, the top portion of FIG. 2 shows the chuck 2 of this high-frequency spindle 1 according to the invention when in the holding position. The ball cage 10 here is rotationally fixed to the actuating rod 6, and when the actuating rod 6 is moved axially forward at least one locking ball 13 is moved radially between an inner freeing position and an outer holding position by a frustoconical cam face 22 that is provided on the inner surface of the axially fixed tool guide sleeve 18. In the freeing position, the locking balls 13 are pressed into the ball seat 14 that is formed here as an round outwardly open groove in the outer surface of the tool shank 20 and thereby radially frictionally locks the tool shank 20 against any unintended axial is movement during operation.

The bottom half of FIG. 2 shows the chuck 2 in the freeing position. Here axial forward displacement of the actuating rod 6 toward the tool shank 20 against the force of the biasing spring 5 positively disengages the locking balls 13 from the ball seat 14 of the tool shank 20. In addition, the tool shank 20 is ejected from the tool guide sleeve 18 when the actuating rod 6 is moved axially so it strikes axially forward against the flat surface 17 of the tool shank 20.

Figure 3:
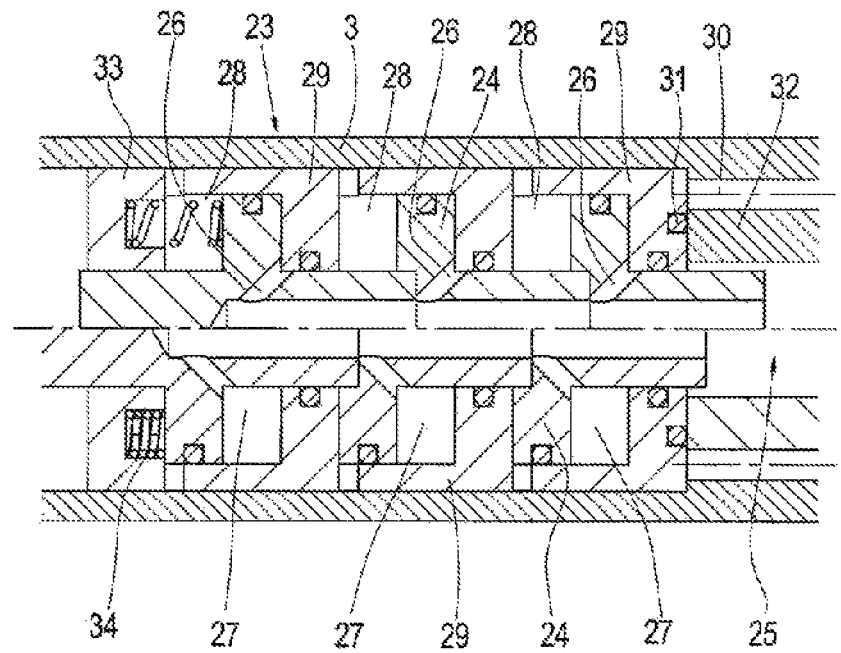
FIG. 3 is a sectional view showing a first release unit of a high-frequency spindle.

A first release unit 23 is shown on the right-hand side of the view and in detail in FIG. 3. The top portion of FIG. 3 shows the release unit 23 in the holding position, while the bottom portion shows the release unit 23 in the freeing position. Since the inside diameter of the shaft 3 is very small, the release unit would not work with a single release piston since this would require very high pressure to operate the system. In order to increase the piston area, which requires a smaller force, a plurality of piston disks 24, exactly three in the embodiment shown, are fixed axially together and connected in series. Here, the release unit 23 rotates together with the chuck 2 and the shaft 3. Due to this integration of the release unit 23 in the rotating shaft 3, no force is exerted during the release action on the bearings of the shaft 3.

Each of the piston disks 24 is axially shiftable in a respective axially forwardly open cup 29 and has a rear face forming therewith a pressurizable rear chamber 27 and an opposite front face 26 forming a front chamber 27 either with a front face of the adjacent cup 29 or with a plug 33 at the front end of the unit 23.

A pressurized actuating fluid, here air, is supplied centrally through a passage 25 in the rotor and passes radially outward through branch passages 26 to the piston disks 24 into the piston chambers 27. Venting opposite chambers 28 the pistons 24 is effected through the outer wall of cylinder cups 29. The return air is discharged through relief holes 30 that are open centrally on a back flat face of the rotor. A flat seal 31 that is installed between the rotor shaft 32 and end piston disk 24 prevents any leakage of air between input air and vent air. The release unit 23 here is secured axially in the shaft 3 by the plug 33. A return spring 34 acts against movement by piston disks 24 from the holding position into the freeing position.

Figure 4:
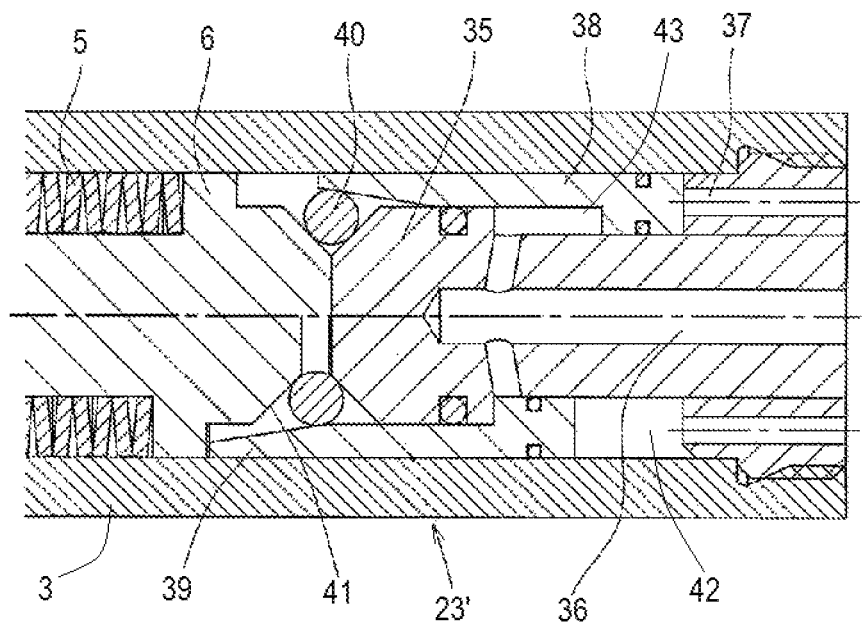
FIG. 4 is a sectional view showing another release unit of a high-frequency spindle.

FIG. 4 shows another embodiment of a release unit 23' of the high-frequency spindle 1 according to the invention. Here again, the top half of the view shows the release unit 23' in the holding position, while the bottom half of the view shows it in the freeing position.

This release unit 23' has a stationary core body 35 that is axially fixed in the tube shaft 3 and surrounded by a double-acting piston 38. This double action in the embodiment shown is made possible by providing two pressure conduits, namely a gripping pressure conduit 36 provided to effect gripping by pressurizing a rear ring compartment 42 and a release pressure is conduit 37 provided to release the chuck 2 by pressurizing a front ring compartment 43.

The piston 38 of the double-acting cylinder 35 in this release unit 23' does not act directly on the actuating rod 6 that is biased by the biasing spring 5. A wedge-shaped actuating rim 39 of the piston 38, when moved axially forward toward the actuating rod 6, moves a release ball 40 radially inward along an inclined surface 41 formed on the actuating rod 6, which axially cams the actuating rod 6 into the freeing position. The actuating wedge 39 and an angled face 41 of the actuating rod 6 are designed here such that a long axial movement of the piston 38 is converted into a short axial movement of the actuating rod 6.

I claim:

1. A high-frequency spindle comprising:
    a tube shaft extending along and rotatable about an axis and having a front end;
    a chuck carried on the front end of the shaft and adapted to fit with a tool or tool holder;
    a ball cage in the shaft and having a radially open window;
    a biaser housing holding the ball cage in the shaft and in which the ball cage can move axially;
    a locking ball radially displaceable in the window between a holding position engaging in a seat of the tool or tool holder and a freeing position clear of the seat;
    an angled surface engageable radially with the ball;
    an actuating rod axially shiftable and coupled to the cage or to the angled surface;
    actuating means for axially shifting the rod and thereby relatively axially displacing the ball and the angled surface and calming the ball with the angled surface into the holding position;
    a primary spring biasing the rod and urging the ball with the angled surface into the holding position; and
    a secondary spring braced directly between the biaser housing and the ball cage and urging the ball cage axially oppositely to a direction in which the primary spring biases the rod.

2. The high-frequency spindle defined in claim 1, there are at least two such locking balls.

3. The high-frequency spindle defined in claim 1, wherein an outside diameter of the high-frequency spindle is smaller than 15 mm.

4. The high-frequency spindle defined in claim 3 wherein the outside diameter is smaller or equal to 10 mm.

5. The high-frequency spindle defined in claim 4, wherein the tool and the tube shaft are formed centered on the axis with interfitting collars and one of the collars is formed with a radially open groove forming the seat.

6. The high-frequency spindle defined in claim 5, wherein the collars fit complementarily together and have complementary radially interengaging surfaces.

7. The high-frequency spindle defined in claim 1, further comprising:
    structure limiting axial travel of the ball cage in the biaser housing.

8. The high-frequency spindle defined in claim 1, wherein the angled surface is formed on the rod.

9. The high-frequency spindle defined in claim 1, wherein the actuating means has a cylinder and plurality of axially spaced cylinders therein coupled axially together and forming a plurality of axially spaced pressurizable compartments.

10. The high-frequency spindle defined in claim 9, wherein the actuating means further has respective axially fixed cylinder cups each forming with a respective one of the cylinders the respective compartment.

11. The high-frequency spindle defined in claim 10, wherein each cylinder cup forms with the tube shaft a gap through which the respective chamber can be vented.

12. The high-frequency spindle defined in claim 1, wherein the actuating means includes a double-acting cylinder having a piston formed with the angled surface.

13. The high-frequency spindle defined in claim 12, wherein the rod has an angled face adjacent the angled surface and axial displacement of the face and surface relative to each other cams the rod axially forward.

14. The high-frequency spindle defined in claim 13, wherein the surface and face are angled for force multiplication in that a movement of the piston through a predetermined stroke creates a movement of the rod through a stroke larger than the predetermined stroke.

15. The high-frequency spindle defined in claim 1, wherein the tool has a shank with a standard dimension and is formed with a radially open groove forming the seat.

16. The high-frequency spindle defined in claim 15 wherein the tool has a diameter smaller than or equal to 3 mm.

\* \* \* \* \*